(12) United States Patent
Soerensen

(10) Patent No.: US 11,274,769 B2
(45) Date of Patent: Mar. 15, 2022

(54) METHOD OF LAYING A PIPE BUNDLE ON THE SEABED

(71) Applicant: SIEMENS GAMESA RENEWABLE ENERGY A/S, Brande (DK)

(72) Inventor: Johnny Soerensen, Videbæk (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 20 days.

(21) Appl. No.: 16/605,624

(22) PCT Filed: Dec. 8, 2017

(86) PCT No.: PCT/EP2017/082067
§ 371 (c)(1),
(2) Date: Oct. 16, 2019

(87) PCT Pub. No.: WO2018/197030
PCT Pub. Date: Nov. 1, 2018

(65) Prior Publication Data
US 2020/0132224 A1    Apr. 30, 2020

(30) Foreign Application Priority Data

Apr. 24, 2017  (DE) .................... 10 2017 206 857.4
Jul. 27, 2017   (DE) .................... 10 2017 212 967.0

(51) Int. Cl.
*F16L 1/16*     (2006.01)
*F16L 3/233*    (2006.01)
(Continued)

(52) U.S. Cl.
CPC ................. *F16L 1/18* (2013.01); *F16L 1/203* (2013.01); *F16L 3/233* (2013.01); *F16L 9/20* (2013.01); *H02G 1/10* (2013.01)

(58) Field of Classification Search
CPC .... H02G 1/10; F16L 3/23; F16L 3/233–2338; F16L 9/20; F16L 1/18; F16L 1/203; F16L 1/24
See application file for complete search history.

(56) References Cited

U.S. PATENT DOCUMENTS 3,086,369 A  *  4/1963  Brown .................... C23F 13/10
                                                     405/172
3,352,356 A  * 11/1967  Wakefield, Jr. ....... E21B 43/013
                                                     166/352
(Continued)

FOREIGN PATENT DOCUMENTS

DE        3606589 A1    9/1987
EP        1524747 A1    4/2005
(Continued)

OTHER PUBLICATIONS

Non-English German Search Report for Application No. 10 2017 212 967.0, dated Dec. 4, 2017.
(Continued)

*Primary Examiner* — Benjamin F Fiorello
*Assistant Examiner* — Stacy N Lawson
(74) *Attorney, Agent, or Firm* — Schmeiser, Olsen & Watts LLP

(57) ABSTRACT

Provided is a method of laying empty pipes on the seabed, which method includes arranging a plurality of empty pipes in a bundle; arranging a bundle-strengthening element in a cavity defined by the pipes of the bundle; binding the bundle; and lowering the bundle to the seabed.

14 Claims, 4 Drawing Sheets

(51) Int. Cl.
*H02G 1/10* (2006.01)
*F16L 1/20* (2006.01)
*F16L 1/18* (2006.01)
*F16L 9/19* (2006.01)

(56) References Cited

U.S. PATENT DOCUMENTS

| | | | | |
|---|---|---|---|---|
| 3,699,692 | A | * 10/1972 | Smith | B63B 35/03 |
| | | | | 405/169 |
| 4,979,296 | A | * 12/1990 | Langner | D07B 3/00 |
| | | | | 29/469 |
| 5,054,881 | A | * 10/1991 | Fisher | G02B 6/4465 |
| | | | | 385/113 |
| 6,538,198 | B1 | 3/2003 | Wooters | |
| 6,979,776 | B1 | * 12/2005 | Zimmermann | H02G 1/06 |
| | | | | 138/111 |
| 2003/0026662 | A1 | * 2/2003 | Vidal | H02G 1/10 |
| | | | | 405/157 |
| 2010/0054677 | A1 | 3/2010 | Figenschou et al. | |
| 2012/0302115 | A1 | * 11/2012 | Horton, III | G01V 1/20 |
| | | | | 441/1 |
| 2016/0254653 | A1 | 9/2016 | Worzyk | |
| 2017/0110859 | A1 | 4/2017 | Gjerull et al. | |

FOREIGN PATENT DOCUMENTS

| | | |
|---|---|---|
| EP | 3086424 A1 | 10/2016 |
| FR | 2561459 A1 | 9/1985 |
| WO | 2012008833 A2 | 1/2012 |
| WO | WO2012008833 A2 | 1/2012 |
| WO | 2015074696 A1 | 5/2015 |
| WO | WO2015074696 A1 | 5/2015 |
| WO | 2015187032 A1 | 12/2015 |
| WO | WO2015187032 A1 | 12/2015 |

OTHER PUBLICATIONS

PCT International Search Report dated Apr. 23, 2018 corresponding to PCT International Application No. PCT/EP2017/082067.
Written Opinion dated Apr. 23, 2018 corresponding to PCT International Application No. PCT/EP2017/082067.

* cited by examiner

METHOD OF LAYING A PIPE BUNDLE ON THE SEABED

CROSS-REFERENCE TO RELATED APPLICATIONS

This application claims priority to PCT Application No. PCT/EP2017/082067, having a filing date of Dec. 8, 2017, which is based on German Application No. 10 2017 212 967.0, having a filing date of Jul. 27, 2017 and German Application No. 10 2017 206 857.4, having a filing date of Apr. 24, 2017, the entire contents all of which are hereby incorporated by reference.

FIELD OF TECHNOLOGY

The following describes a method of laying empty pipes on the seabed. The following further describes a bundling system.

BACKGROUND

An offshore facility such as a wind turbine (mounted on an offshore support structure) requires a transmission link to an on-shore connection point and/or to other offshore facilities such as other wind turbines of a wind farm, a wind farm substation, etc.

Cable connections to/from such off-shore installations can be installed by conventional means, e.g. by simply laying a sub-sea cable on the seabed. A sub-sea cable may optionally be ploughed into the seabed. Sub-sea cables may be installed using horizontal directional drilling. Another approach comprises a step of first arranging empty flexible (plastic) tubes or pipes on the seabed. In this approach, transmission cables are then pushed or pulled through the empty pipes as described in EP3086424A1.

Since cable installation off-shore is quite labour-intensive and costly, it is advantageous to install as many cables as possible during the same operation. However, placing three or more empty pipes together before lowering them to the seabed or underneath the seabed (ploughing or using horizontal directional drilling), gives rise to some problems. For instance, the individual pipes tend to be flattened out, making it difficult to load them with transmission cables, or making them unsuitable for the transport of fluid such as oil or gas. Flattened pipes generally pose a problem for any equipment that is used for such tasks.

Furthermore, since the process of laying cables is quite expensive, normally the wind turbines of a wind park are connected to an off-shore substation or "collector point". An export cable is then used to connect the offshore substation to an on-shore facility. However, the need for an off-shore substation adds significantly to the overall costs of a wind farm.

SUMMARY

An aspect relates to an improved way of laying empty pipes on the seabed that overcomes the problems described above.

According to embodiments of the invention, the method of laying empty pipes on the seabed comprises the steps of arranging a plurality of empty pipes (in some embodiments, at least three) in a bundle; arranging a bundle-strengthening element in a cavity defined by the bundle of empty pipes; binding the bundle; and lowering the bundle to the seabed.

In the context of embodiments of the invention, a bundle comprises three or more empty pipes—which may be of the same diameter—with at least one additional bundle-strengthening element arranged in a cavity of the bundle to give support to the bundle during installation. The bundle-strengthening element is also afforded protection on account of its position within the cavity.

An advantage of the inventive method is that regular unarmoured flexible tubes or pipes can be used. Such unarmoured pipes are generally used for on-shore pipe-laying procedures, and are far less expensive and more flexible than the armoured cables that are normally used for off-shore installations. An objective of embodiments of the invention is a bundle design for empty tubes or pipes which are to be laid down to off-shore installations for the purpose of electricity transport. Of course, pipes of the pipe bundle can be used for the transport of a fluid such as gas or oil.

The inventive method is to bundle three or more empty pipes together and to place an additional bundle-strengthening element or "centre-core cable" within the bundle. Taking a three-pipe bundle as an example (in some embodiments, with three empty pipes of the same radius), the three empty pipes are arranged in a triangular configuration so that a small cavity is formed in the centre, and the bundle-strengthening element is arranged within this cavity. To this end, the bundle-strengthening element has a radius that is smaller than that of the empty pipes and sufficiently large so that the bundle-strengthening element touches each of the empty pipes.

This design is highly beneficial for bundle stability, especially in an installation procedure that deploys horizontal directional drilling. This techniques is established for on-shore installation procedure but is not commonly used for off-shore installations. However, the technique of horizontal directional drilling is being considered for off-shore installation procedures, especially for near-shore wind turbines.

An advantage of the inventive bundling concept is that a bundle of empty pipes can be installed over long distances in a single step, before being split up to connect the empty pipes to individual off-shore installations or arrays of off-shore installations. Because the inventive method is cost-efficient and overcomes the problems mentioned in the introduction, the inventive bundling concept can do away with the need for a substation.

According to embodiments of the invention, the bundling system is realized to carry out the steps of the inventive method and comprises a plurality of drums, each drum carrying a coiled empty pipe; a further drum carrying a coiled bundle-strengthening element; a bundling unit adapted to arrange a plurality of empty pipes in a bundle and to arranging a bundle-strengthening element in a cavity defined by the bundle of empty pipes; a binding unit adapted to bind the bundle; and a feed means adapted to feed the bundle towards the seabed.

An advantage of the inventive bundling system with its "hollow tube" principle is that it can be realized using relatively little additional effort. The empty pipes can be supplied on standard drums to a bundling unit. Similarly, a bundle-strengthening element can be supplied on a standard drum to the bundling unit. The bundling unit can be configured in any number of ways to combine different numbers of empty pipes with one or more bundle-strengthening elements to achieve any number of different bundle configurations, as will be explained below.

Other embodiments and features of the invention are given by the dependent claims, as revealed in the following description. Features of different claim categories may be combined as appropriate to give further embodiments not described herein.

In the following, it may be assumed that an offshore facility is a wind turbine of a wind farm. The wind farm may comprise a large number of wind turbines arranged in arrays.

A cable later inserted into an empty pipe may be a power cable for electricity transport, a fibre-optic cable for communication, etc. However, in the context of embodiments of the invention, any cable later inserted into an empty pipe may be assumed to be used for electricity transport. While the inventive method and bundling system are particularly suited for the installation of empty pipes between an onshore facility and the wind turbines of an offshore wind farm, they may also be used to connect facilities such as oil or gas producing platforms, in which case the tubes or empty pipes are used for the transport of fluids such as oil or gas. In the following, an empty pipe of the bundle may be referred to as a "primary cable", and a bundle-strengthening element may be referred to as a "secondary cable".

The inventive bundling system enables an automatic bundling process, and can be realized for installation on a marine vessel, for example. The empty pipes and the bundle-strengthening element(s) can be guided into the desired configuration and bundled at the same speed as the laying speed of the marine vessel. Equally, the inventive bundling system can be realized as an onshore system that feeds the bundle onto the seabed, and which may also deploy a technique of horizontal drilling to bury the bundle under the seabed.

In one embodiment of the invention, a single bundle-strengthening element is used to provide strength to the bundle. This bundle-strengthening element may itself be a communications cable with a diameter that is large enough to touch each of the empty pipes when it is arranged in a cavity in the interior of the bundle, or to touch two empty pipes when arranged in a channel along the outside of the bundle, formed by two adjacent empty pipes. Such an arrangement may be sufficient to achieve a stable bundle. Alternatively, a bundle-strengthening element may comprise an empty tube which has the desired diameter and which will later be loaded with a communications cable, for example.

The buoyancy of the bundle will depend to a certain extent on the diameter of the empty pipes. Therefore, in an embodiment of the invention, a bundle-strengthening element may be provided to add weight to the bundle. Besides having a bundle centre-core cable, additional cables can be placed in the bundle. For example, a bundle-strengthening element may comprise a twisted wire rope. The bundling system comprises one or more drums, each carrying a coil of such a wire cable. These may add additional weight to the overall bundle and thus prevent the bundle from unintentionally floating upwards from its intended position on or in the seabed.

In a configuration comprising three empty pipes, a single central bundle-strengthening element may be a communications cable, or a tube loaded with such a communications cable. Such a three-pipe bundle may already have sufficient weight to remain in its installation position on or under the seabed. If necessary, such a three-pipe bundle may comprise one or more additional bundle-strengthening element(s) in order to arrive at the necessary weight. For example, a three-pipe bundle may comprise a central communications cable as well as one or more wire-rope bundle-strengthening element(s). The bundling unit is realized to combine a number of empty pipes with a suitable number of bundle-strengthening element(s) in a desired configuration.

Since most off-shore installations require communications lines, the secondary cable could advantageously be a communication cable, for example a fibre-optic cable. Cables such as communication cables are generally not armoured, and may be damaged when installed, especially if the installation method comprises pulling the cable though surrounding material such as soil, sand, rocks and the like, as is the case with a horizontal directional drilling method. As mentioned above, while the bundle-strengthening element may have a diameter that is sufficiently large so that the bundle-strengthening element touches the empty pipes along its length, it is equally possible that the bundle-strengthening element or secondary cable may have a smaller diameter, which may be the case if the bundle-strengthening element is a communications cable such as a fibre-optic cable. The bundle-strengthening element in this case may not necessarily provide the same degree of stability to the bundle, but the cavity formed within the centre of the primary cables would advantageously provide protection or shielding of the secondary cable, since the hollow empty pipes are usually of a strong durable material such as HDPE (high-density polyethylene).

Alternatively or in addition, a bundle-strengthening element can comprise any other cable type, for example a steel wire cable. The mass of such a bundle-strengthening element is chosen to counteract the buoyancy of the empty pipes of the bundle. In this way, the bundle-strengthening element can increase the weight of the bundle, preventing up-drift of the bundle from its position on the seabed.

As explained above, the empty pipes and the bundle-strengthening element(s) are arranged in a bundle immediately prior to installation on the seabed, for example empty pipes and cables are fed from individual drums on a ship or at an on-shore bundling facility (e.g. for horizontal directional drilling), and then prior to being installed on the seabed, the empty pipes and bundle-strengthening element (s) are bundled together. The bundle, prior to being installed on or below the seabed, is bound in some suitable manner to ensure that the bundle remains intact. The step of binding the bundle comprises wrapping a number of tapes around the bundle. A suitable wrapper machine can be used for this purpose. A tape can simply be wound tightly about the bundle to provide the desired effect. Alternatively, a tape may have an adhesive surface so that the tape sticks to the surfaces of the empty pipes. One or more tapes can be wrapped about the bundle in a helical manner, for example. Alternatively, a suitable plastic material may be wrapped about the bundle.

As indicated above, a bundle can be lowered to the seabed from a marine vessel. Alternatively, a bundle can be lowered to the seabed from an onshore bundling facility. This step may be combined with a horizontal directional drilling procedure to bury the bundle under the seabed.

Once a bundle has been installed between its end points— between an onshore facility and a wind turbine of a wind farm, between two wind turbines of a wind farm; etc.—the step of installing transmission cables may commence. The installation of a sub-sea transmission cables in the hollow tubes can be done by pulling/pushing, i.e. a power cable is inserted from one end of an empty tube and pulled from the other end.

It is well known to connect an export cable from a wind farm to a transformer station onshore. All power generated by a wind farm is transmitted through the transmission cables. At times of high production, the cables will heat up due to the power loss. Since most of the cabling is located in water or below the seabed, there will be a natural cooling of these parts. However, at the end positions of the export cable i.e. where it is attached to the substation or turbine and/or where the cable enters ashore, the cable may not be cooled sufficiently. Such overheated parts of the cable are referred to as "hot spots" and may cause damage to the cable. A further advantage of the hollow tube principle is that, in addition to carrying the transmission cable, the tube can be filled with water during or after cable installation. Therefore, in an embodiment of the invention, the step of lowering the bundle to the seabed is followed by a step of subsequently pumping water into an empty pipe. In this way, water can advantageously be filled into the tubes (before or after the transmission cables are installed) at least over part of the tube length to provide some cooling means, especially around the cable end connections.

In an embodiment of the invention, water may be used as the driving force to install a transmission cable. In such a technique, a "pig" is connected to one end of a transmission cable and inserted into one end of an empty tube or pipe. The pipe is provided with a water inlet and a seal through which the transmission cable passes. When pressurized water is pumped into the pipe, the pig is propelled along the pipe, pulling the transmission cable behind it. An arrangement of friction rollers (between a drum carrying the transmission cable and the insertion end of the tube) can assist in pushing the transmission cable into the pipe.

BRIEF DESCRIPTION

Some of the embodiments will be described in detail, with reference to the following figures, wherein like designations denote like members, wherein.

Figure 6:
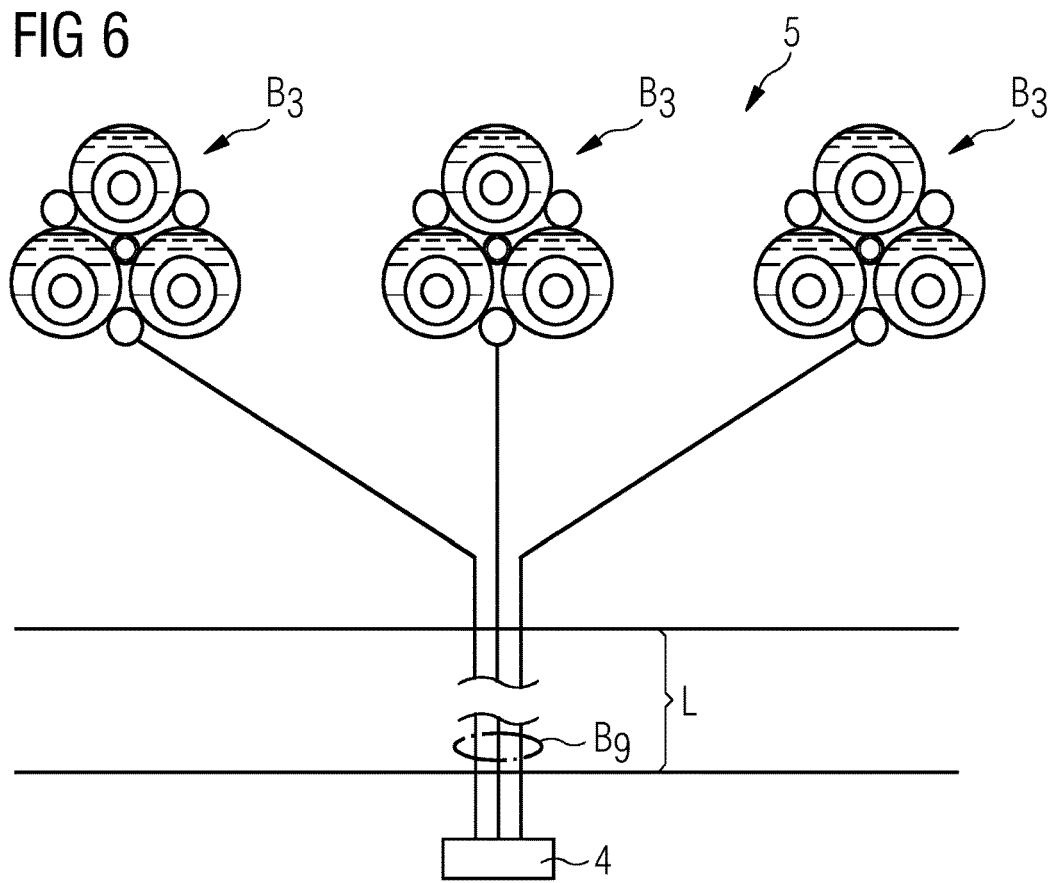
FIG. 6 shows an export line formed as a bundle using the inventive method.
Figure 7:
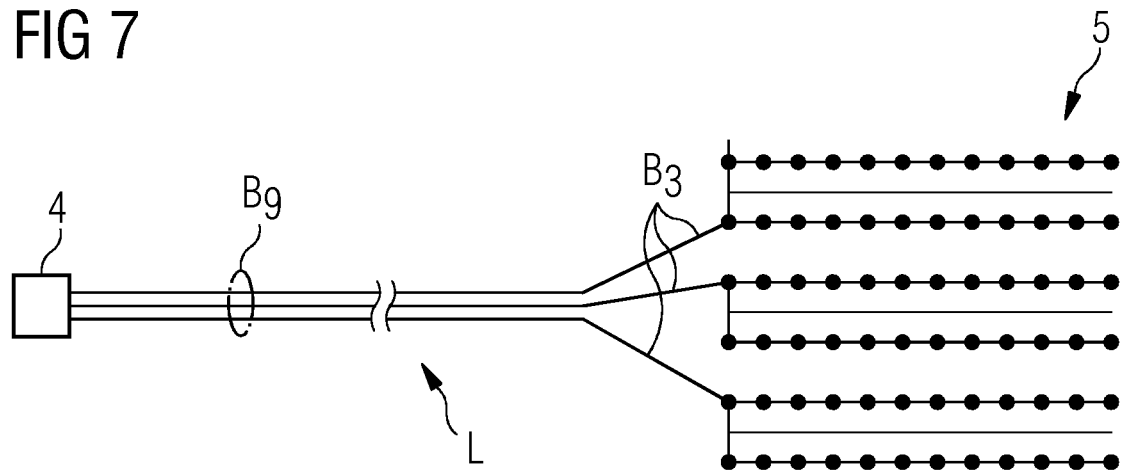
Figure 8:
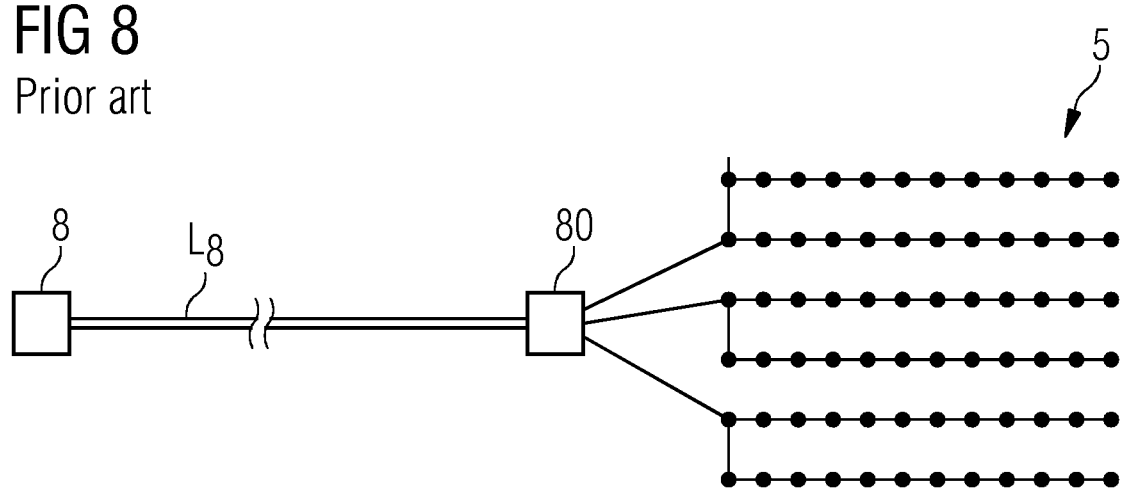
Figure 9:
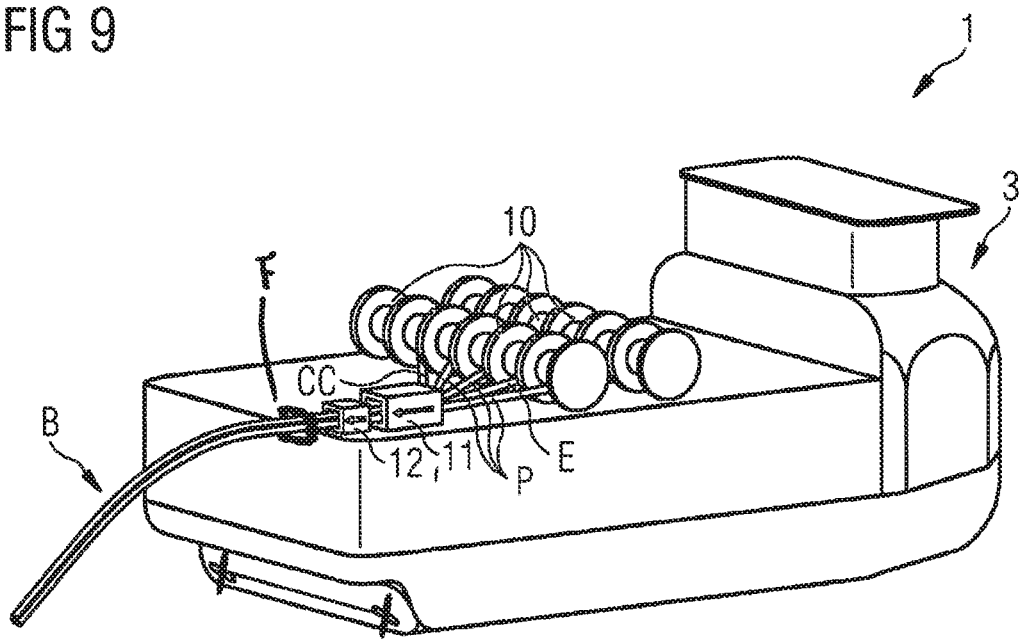

FIG. 7 indicates groups of wind turbines connected to an onshore substation by the bundle described in FIG. 6;

FIG. 8 shows a prior art approach to installation;

FIG. 9 shows an embodiment of the inventive bundling system; and

Figure 10:
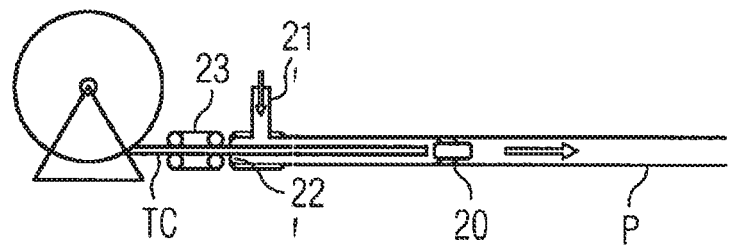

FIG. 10 shows a step of loading an empty pipe with a transmission cable.

DETAILED DESCRIPTION

Figure 1:
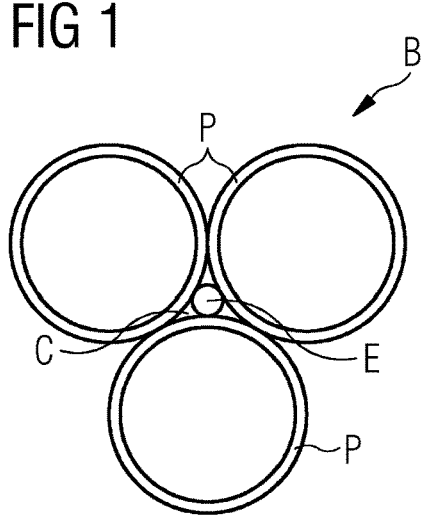
FIG. 1 shows a first bundle that can be formed using embodiments of the inventive method as described herein.

FIGS. 1-5 show various different bundles B, $B_3$, $B_6$, $B_9$ that can be formed using the inventive method. In FIG. 1, the bundle B is made of three empty pipes P, each with the same diameter. These empty tubes P or pipes P may be used to accommodate transmission cables to an offshore installation such as a wind turbine, for instance. Alternatively, they may be used to transport gas or oil from an offshore drilling facility to an onshore depot. A cavity C is formed by the triangular configuration of the three empty pipes P, and a bundle-strengthening element E is arranged in this cavity C during the bundling procedure. The inner bundle-strengthening element can be a communications cable E. Alternatively, the bundle-strengthening element E can be hollow and large enough to later accommodate a communications cable. The diameter of the bundle-strengthening element E is chosen so that it just fits inside the cavity C and touches each of the surrounding pipes P.

Figure 2:
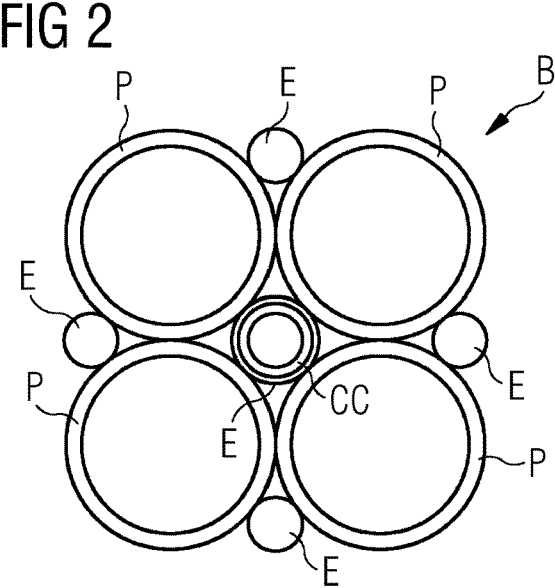
FIG. 2 shows a second bundle that can be formed using embodiments of the inventive method as described herein.

In FIG. 2, the bundle B is made of four empty pipes P, each with the same diameter. In this exemplary embodiment, a hollow tube E is arranged in the cavity formed by the four empty pipes P, and the hollow tube E is loaded with a communications cable CC. The diagram also shows several further bundle-strengthening elements E arranged on the outside of the bundle B in the channels formed by adjacent pipes P. In this embodiment, these outer bundle-strengthening elements E are wire ropes or wire cables that have sufficient weight to ensure that the bundle B remains submerged, i.e. to counteract the buoyancy of the air in the empty pipes P.

Figure 3:
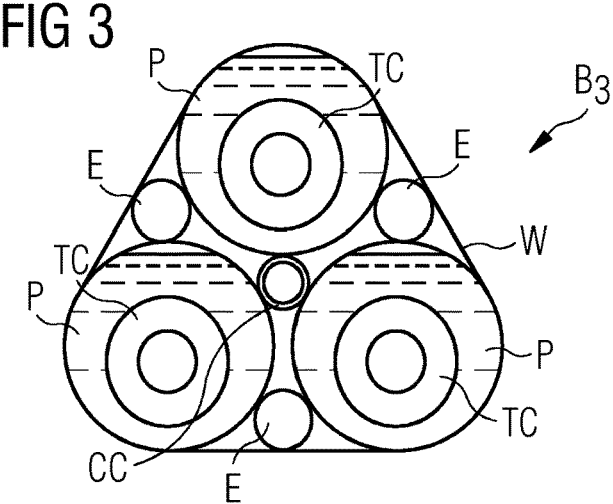
FIG. 3 shows a third bundle that can be formed using embodiments of the inventive method as described herein.

FIG. 3 shows a three-pipe bundle $B_3$. The three pipes P have each been loaded with a transmission cable TC, and the remaining space has been filled with water for the purpose of cooling the transmission cables TC. The inner bundle-strengthening element CC is a communications cable such as a fibre-optic cable. In this exemplary embodiment, three more outer bundle-strengthening elements E are arranged in the channels formed by the three pipes P along the outside of the bundle $B_3$. These outer bundle-strengthening elements E may be wire ropes or cables, for example. Of course, it may be sufficient to use only one or two such bundle-strengthening elements E, or none at all if the weight of the inner bundle-strengthening element is sufficient to give the bundle the desired stability. The diagram also indicates a wrapping tape W that serves to hold the bundle together. It may be assumed that all bundles described herein can be wrapped after the bundle is formed, using a wrapper machine as described above.

Figure 4:
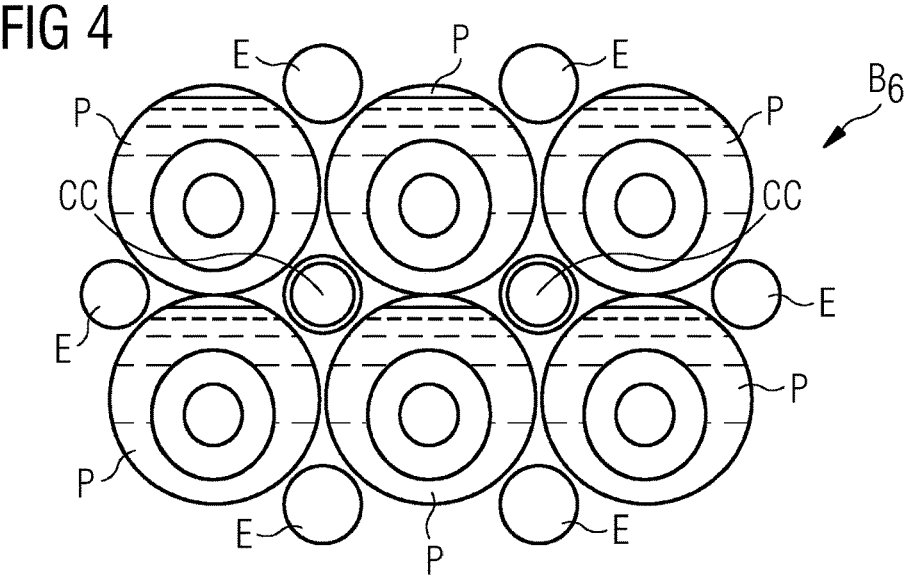
FIG. 4 shows a fourth bundle that can be formed using embodiments of the inventive method as described herein.
Figure 5:
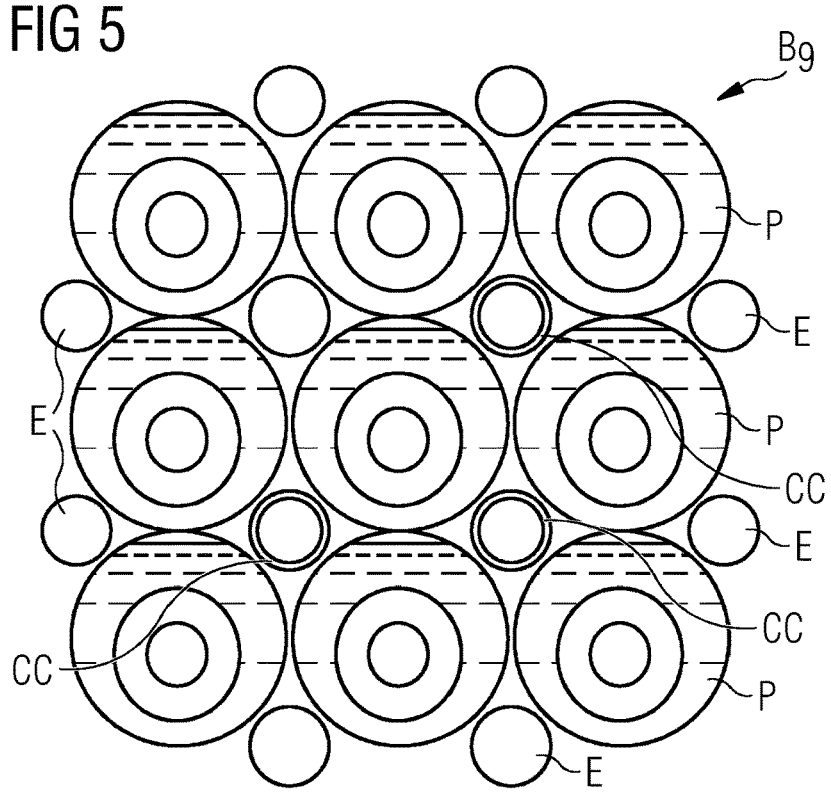
FIG. 5 shows a fifth bundle that can be formed using embodiments of the inventive method as described herein.

Similarly to FIG. 3, FIG. 4 shows a six-pipe bundle $B_6$. Here also, the six pipes P have each been loaded with a transmission cable TC. Two inner bundle-strengthening elements CC are provided in the form of communications cables. In this exemplary embodiment, six additional outer bundle-strengthening elements E are arranged in channels formed by adjacent pipes P along the outside of the bundle $B_6$. This six-pipe bundle $B_6$ can extend from an onshore location to the perimeter of a wind farm where it is divided into two three-pipe bundles $B_3$ similar to that described in FIG. 3 above. Each three-pipe bundle can be formed to comprise three pipes, a communications cable CC in the centre, and three outer bundle-strengthening elements E arranged in the channels formed along the outside of the bundle. FIG. 5 shows a nine-pipe bundle $B_9$, which can be divided into three three-pipe bundles $B_3$ similar to that described in FIG. 3 above.

Such a division is illustrated in FIG. 6, which shows an export line L with a length in the region of 50 km extending from an onshore substation 4 to an offshore windfarm 5. At the windfarm, the nine-pipe bundle $B_9$ is divided into three smaller bundles $B_3$, each with three pipes P, an inner communications cable CC acting as a bundle-strengthening element and a number of outer bundle-strengthening elements E. The pipes P can be loaded with the transmission cables TC after completion of the bundle-laying procedure.

FIG. 7 indicates six groups of twelve wind turbines (indicated by the six strings of dots). Each wind turbine "string" is connected to the onshore substation by a three-pipe bundle $B_3$, which in this exemplary embodiment has a capacity of 145 kV, and the three bundles $B_3$ shown in the diagram originate from a nine-pipe bundle $B_9$ described in FIG. 5 and FIG. 6 above.

In a prior art approach as shown in FIG. 8, wind turbines of a windfarm 5 must be connected to an offshore substation 80 over transmission lines, each with a capacity of 33-66 kV. The offshore substation 80 is connected to an onshore substation 8 by means of a transmission line $L_8$ with a capacity of 130-220 kV.

FIG. 9 shows an embodiment of the inventive bundling system 1. In this embodiment, the bundling system is installed on a marine vessel 3. The bundling system 1 comprises a plurality of drums 10. Several drums have been loaded with coiled empty pipes P. At least one other drum has been loaded with coiled bundle-strengthening elements, e.g. a communications cable CC to be enclosed by the pipes of a bundle, and a number of further drums carrying wire cables E to provide additional weight to the bundle. A bundling machine 11 is fed with the desired number of empty pipes P and the desired bundle-strengthening elements E, CC, and arranges these in a bundle B, for example any bundle described in FIGS. 1-5 above. As the bundle B emerges from the bundling machine 11, it is wrapped in tape by a bundle wrapper 12, and pushed downwards into the sea so that it is lowered to the seabed. For the sake of clarity, such a feeding unit F is shown schematically in the diagram. The marine vessel 3 proceeds through the water at a rate that is matched to the speed of the bundling system 1.

FIG. 10 shows a step in a later procedure in which an empty pipe P is loaded with a transmission cable TC. A "pig" 20 is connected to one end of a transmission cable TC and inserted into one end of a pipe P. The pipe P is provided with a water inlet 21 and a seal 22. When pressurized water is pumped into the pipe P, the pig 20 is propelled along the pipe P, pulling the transmission cable TC behind it. Friction rollers 23 can assist in pushing the transmission cable TC into the pipe P.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of laying empty pipes on the seabed, the method comprising:
   arranging a plurality of empty pipes in a bundle, wherein the plurality of empty pipes includes at least three pipes;
   arranging at least one bundle-strengthening element in a cavity defined by the plurality of empty pipes of the bundle, wherein the cavity is entirely surrounded or substantially surrounded by the plurality of empty pipes of the bundle;
   binding the bundle; and
   lowering the bundle to a seabed, wherein the weight of the at least one bundle-strengthening element is chosen to counteract the buoyancy of the plurality of empty pipes prior to or during lowering of the bundle to the seabed and ensure that the bundle remains submerged.

2. The method according to claim 1, wherein the radius of the bundle-strengthening element is chosen such that the bundle-strengthening element touches all empty pipes of the bundle.

3. The method according to claim 1, wherein the step of binding the bundle comprises wrapping tape around the bundle.

4. The method according to claim 1, wherein the empty pipes have the same diameter.

5. The method according to claim 1, wherein an empty pipe of the plurality of empty pipes is an unarmoured pipe.

6. The method according to claim 1, wherein the step of lowering the bundle to the seabed is followed by a horizontal directional drilling procedure to bury the bundle into the seabed.

7. A method according to claim 1, wherein the step of lowering the bundle to the seabed is followed by a step of installing a transmission cable arrangement into a pipe of the plurality of empty pipes.

8. The method according to claim 1, wherein the step of lowering the bundle to the seabed is followed by a step of pumping water into the plurality of empty pipes.

9. A bundling system, the bundling system comprising:
   a plurality of drums, each drum carrying a coiled empty pipe;
   at least one further drum carrying a coiled bundle-strengthening element; and
   a bundling unit adapted to arrange a plurality of the coiled empty pipes in a bundle and to arrange the coiled bundle-strengthening element in a cavity in the interior of the bundle, wherein the plurality of the coiled empty pipes includes at least three pipes, wherein the cavity is entirely surrounded or substantially surrounded by the plurality of empty pipes of the bundle, and wherein the weight of the at least one coiled bundle-strengthening element is chosen to counteract the buoyancy of the coiled empty pipes prior to or during lowering of the bundle to a seabed and ensure that the bundle remains submerged.

10. The bundling system according to claim 9, further comprising a binding unit adapted to bind the bundle.

11. The bundling system according to claim 9, further comprising a feeding unit adapted to feed the bundle onto or into the seabed.

12. The bundling system according to claim 9, wherein the bundle-strengthening element comprises a communications cable or an empty tube configured to accommodate a communications cable.

13. The bundling system according to claim 9, wherein the bundle-strengthening element comprises a wire rope.

14. The bundling system according to claim 13, wherein the bundling system is installed on a marine vessel.

* * * * *